M. L. SEVERY.
CAMERA.
APPLICATION FILED FEB. 23, 1915.
1,241,773.
Patented Oct. 2, 1917.
3 SHEETS—SHEET 1.
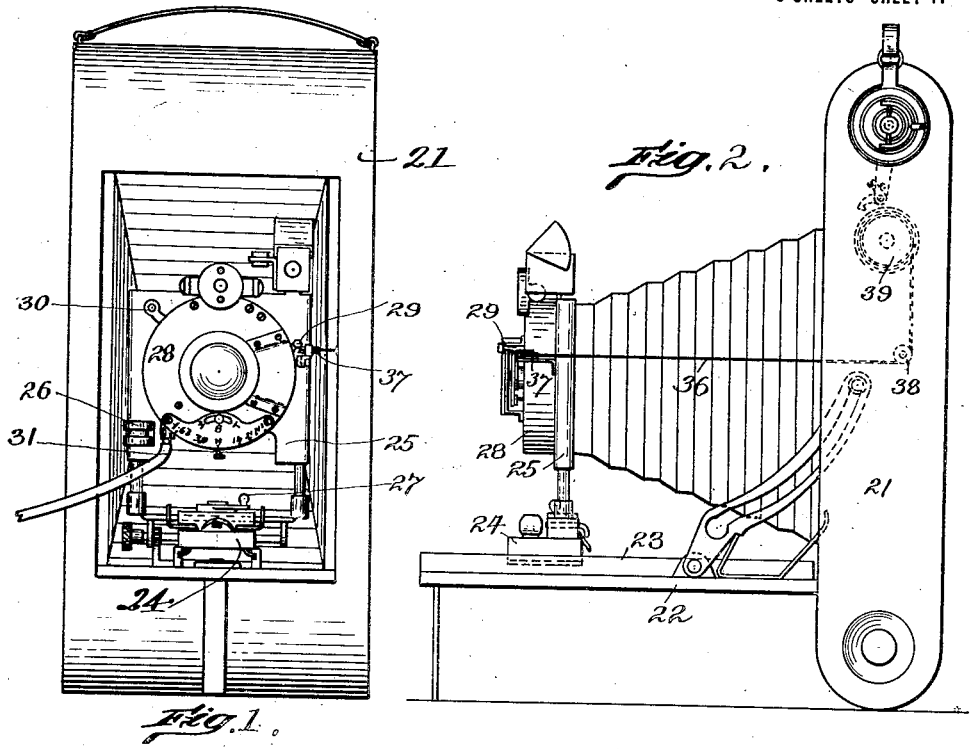
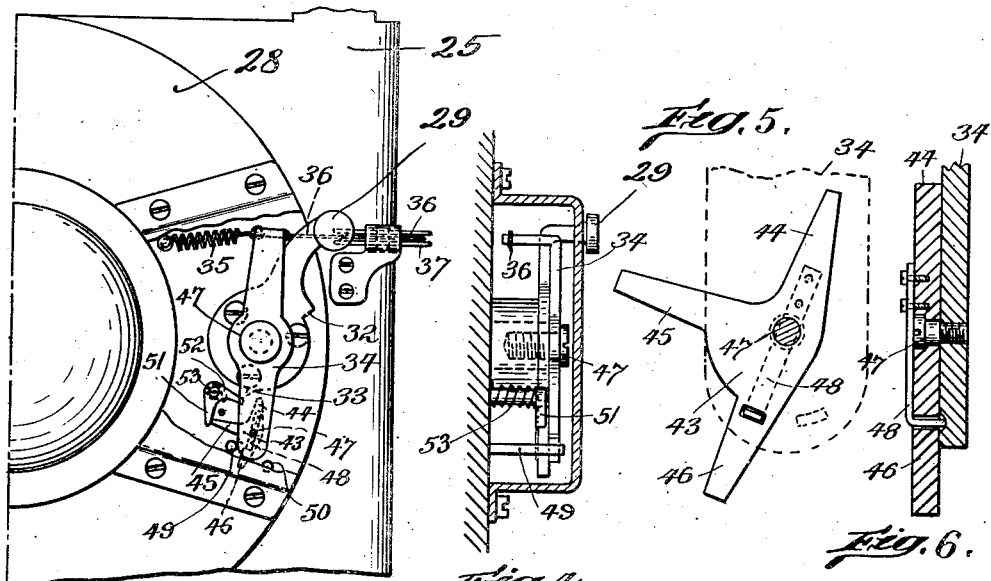
Witnesses:
Inventor:
Melvin L. Severy
by Dodge and Sons, Attys.

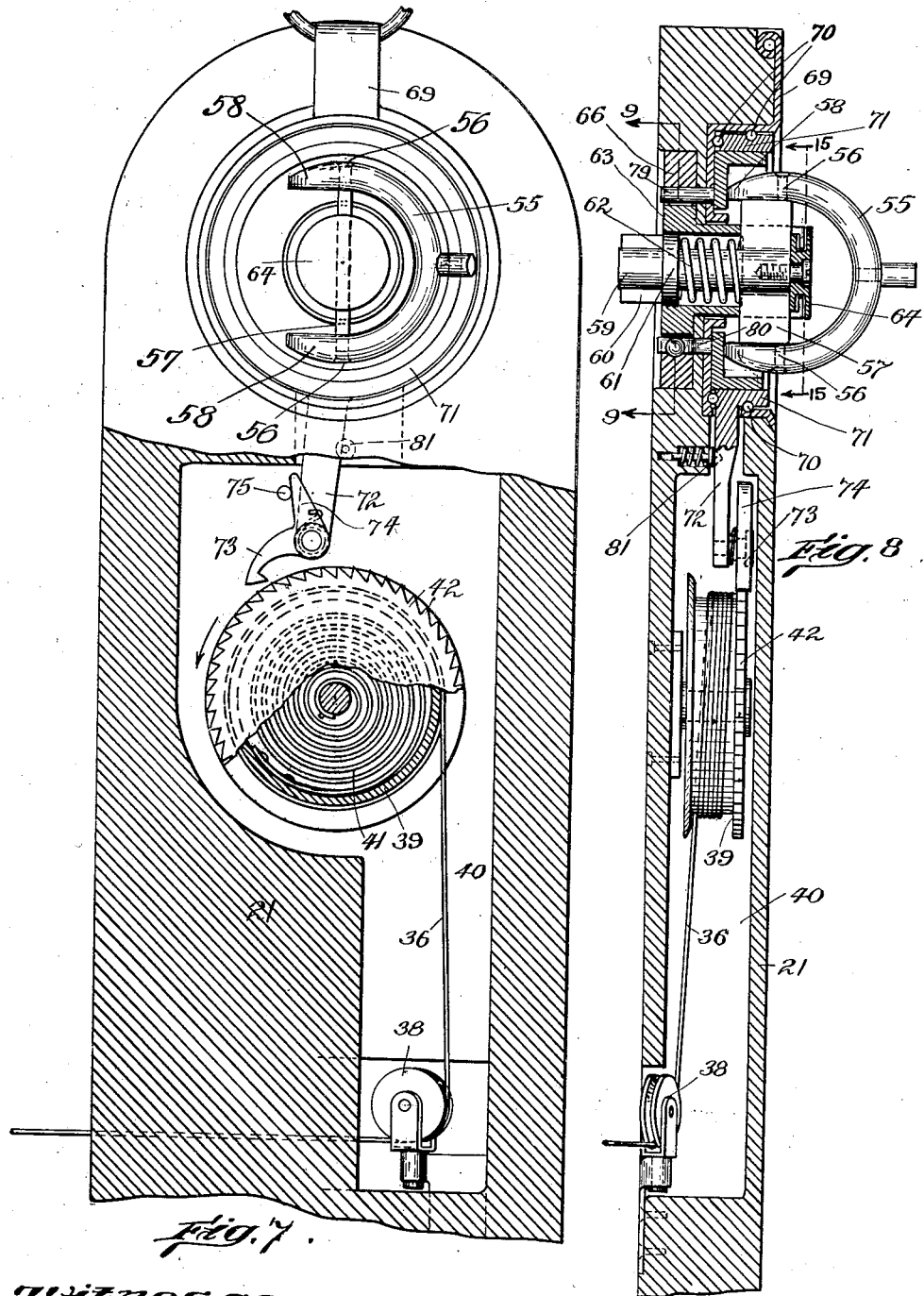

M. L. SEVERY.
CAMERA.
APPLICATION FILED FEB. 23, 1915.

1,241,773.

Patented Oct. 2, 1917.
3 SHEETS—SHEET 3.

Witnesses:
K. E. Montague
H. E. Shellebury

Inventor:
Melvin L. Severy
by Dodge and Sons, Attys.

UNITED STATES PATENT OFFICE.

MELVIN L. SEVERY, OF LOS ANGELES, CALIFORNIA, ASSIGNOR TO SEVERY MANUFACTURING COMPANY, OF BOSTON, MASSACHUSETTS, A CORPORATION OF MASSACHUSETTS.

CAMERA.

1,241,773. Specification of Letters Patent. Patented Oct. 2, 1917.

Application filed February 23, 1915. Serial No. 10,025.

*To all whom it may concern:*

Be it known that I, MELVIN L. SEVERY, a citizen of the United States, residing at Los Angeles, in the county of Los Angeles and State of California, have invented certain new and useful Improvements in Cameras, of which the following is a specification.

This invention relates to cameras and particularly to an interlocking arrangement between the shutter mechanism and the film winding mechanism, designed to prevent the making of a second exposure on a single film, to prevent the accidental turning forward of an unexposed film and to indicate whether the film has or has not been wound.

Devices of this general character have heretofore been patented, but these as a rule, either are not adapted to focusing types of camera, or else depend on pneumatic actuation which is uncertain and undesirable.

The present invention is adapted to use with any type of camera, and in the drawings I illustrate it as applied to a familiar folding camera having a so-called "compound" shutter. This shutter is chosen as typical of the class which operates automatically for "time" and "bulb" exposures but must be set for "instantaneous" exposures. The interlock is applied to the setting lever, and is thus rendered inoperative by merely adjusting the shutter for "time" exposures. The invention in its broadest aspects is not limited to this type of shutter but may be applied to the actuator levers of automatic shutters provided some holdout device is included to operate in time exposures, so that the interlock will not preclude the closing of the shutter. The compound shutter includes in its structure such a device or its equivalent and hence is suited to the simple illustration of the invention.

In the drawings:

Figure 1 is a front elevation of a camera with the invention applied;

Fig. 2 is a side elevation of the same;

Fig. 3 is an enlarged fragmentary front elevation of a portion of the lens board and shutter casing, showing the shutter set-lever and interlock;

Fig. 4 is a fragmentary section showing the set-lever and interlock;

Fig. 5 is an enlarged fragmentary front view of the interlocking-lever and locking-pawl;

Fig. 6 is an axial section of the parts shown in Fig. 5;

Fig. 7 is an enlarged fragmentary section of the side of the camera frame, showing the spring drum and tension, release pawl;

Fig. 8 is a section transverse to Fig. 7;

Figure 9:
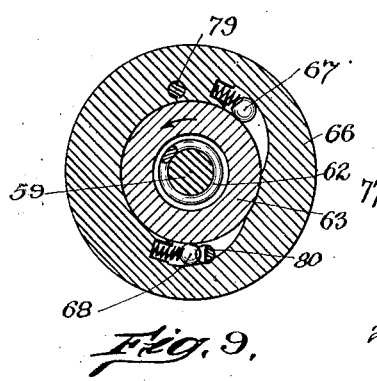
Fig. 9 is a fragmentary section on the line 9—9 of Fig. 8.

In the drawings 21 represents the frame or case of the camera, 22 the focusing bed hinged thereto and 23 the focusing guides or ways, on which the carriage 24 for the lens board 25 slides. The lens board 25 is adjustable on carriage 24 in two lateral directions by means of nut 26 and clamp 27 respectively. The shutter mechanism is indicated generally at 28, and is familiar in its general construction to those skilled in the art. It is set for instantaneous exposures by swinging arm 29 in a clockwise direction and is released by the depression of trigger 30, or by the actuation of a pneumatic bulb or cable release connected at 31. For time or bulb exposures the set arm 29 is not used, the shutter being opened and closed directly by either release mechanism. Other parts of the camera are illustrated in a general way and will readily be recognized, the camera being a standard type of folding, roll film instrument. It is chosen as typical of a wide range of cameras to which the application of interlocks is difficult because of the multiplicity of adjustments offered by the camera and required in its ordinary use.

The shutter set-lever 29 is provided with a shoulder 32 and a ratchet tooth 33 positioned as shown. Mounted coaxially with the lever 29 is a two armed lever 34, whose upper end is constantly urged to the left by a spring 35, but is normally held to the right by a flexible and substantially unstretchable cord 36, which passes around guide pulleys 37 and 38 to a drum 39 concealed in a pocket 40 in the camera case 21. The drum 39 is urged in a winding direction by a spring 41, and is provided with peripheral ratchet teeth 42 for a purpose to be described. The spring 41 overpowers the spring 35, so that the lever 34 is swung in a counterclockwise direction as viewed in Fig. 3 only when drum 39 is wound backward in opposition to the spring 41 to release cord 36.

The lower arm of lever 34 carries a dog 43 having three arms 44, 45 and 46 arranged as shown. The dog 43 is pivoted at 47 on the lever 34, and is held in either of its two limiting positions by an impositive spring detent 48. The clockwise movement of arm 34 is limited by a stop 49. The counterclockwise movement of arm 34 is limited by a stop 50 which engages the arm 46 and arrests arm 34 after dog 43 has rocked to the limiting position shown in Fig. 5. When the dog 43 is in this position the arm 45 will on the reverse movement of lever 34 engage arm 51 on pawl 52 and retract this pawl out of the path of tooth 33 against the resistance of spring 53.

This condition is shown in Fig. 3. If then the shutter be set by swinging lever 29 in a clockwise direction the arm 44 is struck by shoulder 32. This rocks dog 43 to the opposite limiting position, releasing pawl 52. When the shutter is released, arm 29 swings back to its initial position and just before it comes to rest pawl 52 rides over tooth 33 and locks the shutter against resetting. The mechanism now remains in this condition until cord 36 is slackened, allowing spring 35 to turn lever 34 counterclockwise. This resets dog 43, which upon the subsequent tightening of cord 36 retracts pawl 52.

The slackening and tightening of cord 36 is caused by a ratchet mechanism operating on the teeth 42, on drum 39 and engaging when the winding-key is turned up and disengaging when it is folded down. The lens board 25 is thus free to be moved in any direction without affecting the locking mechanism except when the winding-key is up, a condition which is intended to exist only during the winding process.

Figure 10:
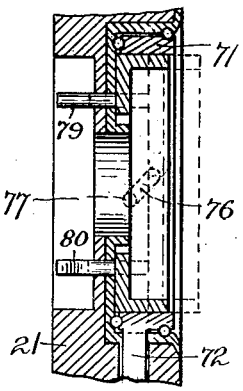
Fig. 10 is a fragmentary view, similar to Fig. 8, with the winding key removed.
Figure 11:
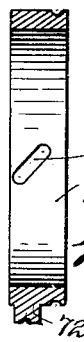
Fig. 11 is a fragmentary section of the ratchet-arm yoke.
Figure 12:
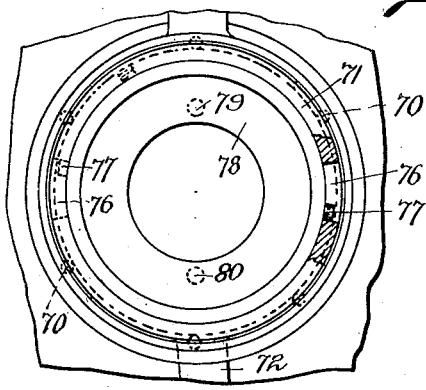
Fig. 12 is a detail view of the mounting of the ratchet-arm yoke.
Figure 13:
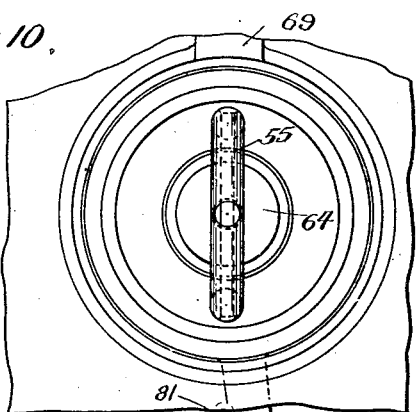
Fig. 13 is an end view of the winding-key, parts being broken away to show the ratchet-arm and ratchet.
Figure 14:
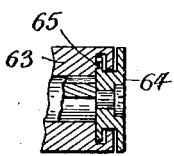
Fig. 14 is a fragmentary axial section of the key end of the spool spindle.
Figures 15, 16:
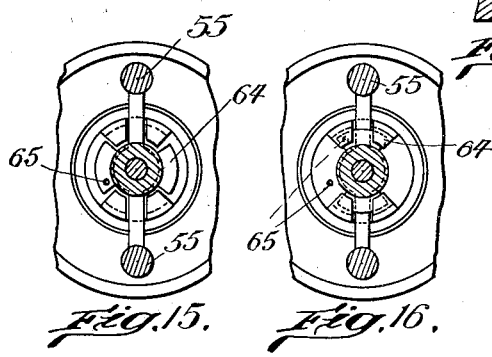
Figs. 15 and 16 are sections on the line 15—15 of Fig. 8, showing the bayonet lock for the spool spindle, respectively in disengaged and engaged positions.
Figure 17:
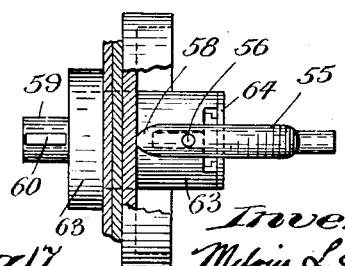
Fig. 17 is an elevation of the spool spindle and winding-key, parts thereof being shown in section.

Referring now to Figs. 7 to 17, the winding-key is indicated at 55 and consists of a metal bow pivoted at 56 to a yoke 57. The key 55 has projections 58, intended to exert a caming action when the key is turned up, as will be explained. The yoke 57 is connected to a spindle 59, having a cross tongue 60 designed to enter a corresponding slot in the usual spool (not shown) which receives the exposed film. The spindle 59 has a shoulder 61, and a spring 62 bears against this and against a shoulder formed on the ratchet sleeve 63, to urge the spindle 59 in its inward or spool engaging direction. A bayonet locking disk 64 is rotatably mounted on the outer end of spindle, and engages a companion socket formed in the outer end of sleeve 63 to hold spindle 59 inward except when intentionally released for the insertion of a new spool (see Figs. 14—17). It is held by detent catches, of any suitable form, indicated at 65. The ratchet sleeve 63 turns in a shell or ring 66 having two oppositely acting spring pressed ball ratchets or clutches 67 and 68, the ratchet 67 being the usual one serving to lock the spindle against turning backward, and the ratchet 68 holding the spindle against forward rotation except when released as will appear.

The key 55 is, as is customary, mounted in a recess in the side of the frame 21, and folds down into this recess around pivots 56. This recess is faced with a metallic shell 69 of circular conformation and in this is mounted on bearing balls 70 an annular yoke 71 having an arm 72 extending downward nearly to the drum 39. The arm 72 carries, at its lower end, a spring pressed pawl 73 adapted to engage the teeth 42 on the edge of drum 39. The pawl 73 has a tail 74, which collides with a stop 75 in one limiting position of the arm 72 and retracts the pawl from the ratchet 42. The annular yoke 71 is provided with two diagonal slots 76 placed at about 45°, and in these work two radially extending pins 77 fixed on an annulus 78 mounted within the yoke 71. This annulus 78 has an inwardly extending flange against which bear the cam projections 58 of key 55 when the latter is turned up. It is held against rotation by two pins 79 and 80, which slide in holes formed in shell 69, case 21 and ratchet ring 66, and which thus guide annulus 78 in movements parallel to the axis of spindle 59. The pin 80 is formed with a cam or tapered portion, which engages clutch ball 68, when annulus 78 pushed in, and forces it back to release the spindle 59 for forward rotation.

The parts just described are so arranged as to loosen and tighten cord 36 by the simple act of turning up or folding down key 55. When the key is down, spindle 59 is locked against rotation in either direction. When the key 55 is turned up, annulus 78 is forced inward releasing clutch 68 by means of pin 80, thus freeing the spool for forward rotation. At the same time, the inward movement of annulus 78 turns yoke 71 through the action of pins 77 and slots 76, swinging arm 72 to the right (in Fig. 7), and releasing pawl 73. This pawl engages the teeth 42 and turns the drum 39 to slacken cord 36. After the film has been wound, the key 55 is turned down, again releasing annulus 78. Spring 41 turns drum 39 back. This turns the yoke 71 back until pawl 73 is disengaged, at which time an impositive latch 81 engages arm 72 to retain it. The backward turning of yoke 71 moves annulus 78 outward, withdrawing pin 80, and again allowing clutch ball 68 to act so that the winding spindle is locked. The slackening and tightening of cord 36 has now released the shutter for the next exposure in the manner already described.

The drum 39 is free at all times except when the key 55 is turned up so that the focusing and centering of the picture are not interfered with. When the camera is closed the drum 39 winds up the cord. The shutter is locked against repeated instantaneous exposures until the key has been turned up and again down and as this is done only to wind and replace the film double exposures are prevented. If the shutter set is locked it indicates at once that the film has not been wound. The winding spool is locked against mischievous and meddlesome turning and against accidental turning in placing the camera in or removing it from the carrying case, etc.

Certain features of the invention, particularly the shutter lock and cord connection, are applicable to cameras other than those using roll film, and I use the term "sensitized medium" to cover generally such broad equivalents as plates, etc., in claims intended not to be restricted to roll film cameras.

In place of the cord any flexible and substantially unstretchable element may be used, and will serve as an equivalent. The term "cord" is used in the claims in this sense and as an inclusive rather than as a limiting term.

Having thus described my invention, what I claim is:—

1. In a camera the combination of means for positioning successive sensitized media; a shutter having a setting mechanism for instantaneous exposures and independently operable means for producing other types of exposure; a locking device associated with said setting mechanism and adapted to be locked by one setting thereof to prevent a succeeding setting; and a release mechanism operatively connected with said means for positioning successive sensitized media and with said locking device and adapted to release the latter upon the positioning of a new sensitized medium.

2. In a camera the combination of roll film-feeding mechanism; an actuating key therefor movable between operative and inoperative positions; a shutter having a setting mechanism for instantaneous exposures and independently operable means for producing other types of exposure; a locking device associated with said setting mechanism and adapted to be locked by one setting thereof to prevent a succeeding setting; and a release mechanism operatively connected with said locking device for releasing the latter and adapted to be itself actuated by the movement of said actuating key between inoperative and operative positions.

3. In a camera the combination of roll film-feeding mechanism; an actuating key therefor movable between operative and inoperative positions; a shutter having a setting mechanism for instantaneous exposures and independently operable means for producing other types of exposure; a locking device associated with said setting mechanism and adapted to be locked by one setting thereof to prevent a succeeding setting; a release mechanism operatively connected with said locking device for releasing the latter and adapted to be itself actuated by the movement of said actuating key between inoperative and operative positions; and a locking device for said film-feeding mechanism, adapted to be locked by the movement of said actuating key from operative to inoperative position and to be released by the reverse movement.

4. In a camera, the combination of roll film-feeding mechanism; an actuating key therefor movable between operative and inoperative positions; a shutter having a part which is moved in making an exposure prior to the release of the shutter; a locking device for said part adapted to be locked by one movement thereof to prevent a succeeding movement; and a release mechanism operatively connected with said locking device for releasing the latter and adapted to be itself actuated by the movement of said actuating key between inoperative and operative positions.

5. In a camera, the combination of roll film-feeding mechanism; an actuating key therefor movable between operative and inoperative positions; a shutter having a part which is moved in making an exposure prior to the release of the shutter; a locking device for said part adapted to be locked by one movement thereof to prevent a succeeding movement; a release mechanism operatively connected with said locking device for releasing the latter and adapted to be itself actuated by the movement of said actuating key between inoperative and operative positions; and a locking device for said film-feeding mechanism, adapted to be locked by the movement of said actuating key from operative to inoperative position and to be released by the reverse movement.

6. The combination with a camera having a mechanism for feeding a sensitized medium and having a shutter mechanism mounted for movement relatively thereto; of a locking device operatively related to said shutter and adapted to be locked by one actuation thereof to prevent a succeeding actuation thereof; a normally tensioned flexible cord connected with said locking device to release the same by the alternate slackening and tensioning of said cord; and a releasing device operatively connected with the means for positioning the sensitized medium and adapted successively to slacken and tension said cord by the operation at the time of actuation of said positioning device.

7. The combination in a camera of roll film-feeding mechanism; a shutter mechanism mounted to move bodily relatively thereto; a locking device operatively related to said shutter mechanism and adapted to be set by one actuation of the shutter to prevent a succeeding actuation thereof; a spring urged releasing member for said locking device; a flexible cord connected to said releasing member; a tensioning device connected with said cord and normally acting through the same to overpower the spring of said releasing member; and an actuating key for said film-feeding mechanism, movable between operative and inoperative positions and operatively connected to said tensioning device to release the same and slacken said cord when said key is moved to operative position.

8. The combination with a camera shutter of a setting member having a locking tooth and a striker; a locking dog; a spring urging said dog in a direction to engage the tooth on said member to lock said member against the setting movement; a release lever having a normal position of rest; a stop; a holdout member movably mounted on said release lever and movable alternately between positions to holdout and to free said locking dog respectively by the collision of the holdout member with said stop when the lever is moved from normal position and by collision of said striker with said holdout member when the set member is actuated, and means for moving said lever from and back to normal position.

9. In a camera the combination of a roll film-feeding device; a shutter mechanism bodily movable relatively thereto; a shutter-lock mechanism adapted to be set by one actuation of the shutter to prevent a succeeding actuation; a release for said shutter-lock mechanism adapted to be actuated by the movement of a spring-held part thereof from and back to normal position; a cord connected to said part; a spring actuated reel connected to said cord and normally tending to wind up and tension the same; a winding key for said film-feeding device adapted to be moved from inoperative to operative position; and a ratchet mechanism connected mechanically with said key and adapted to be actuated by the movement thereof to operative position to turn said reel in opposition to said spring and thereby release said cord.

In testimony whereof I have signed my name to this specification in the presence of two subscribing witnesses.

MELVIN L. SEVERY.

Witnesses:
 ELIZABETH F. SEVERY,
 BELLE W. BOARDMAN.